United States Patent
Noguchi et al.

(10) Patent No.: US 6,576,311 B2
(45) Date of Patent: *Jun. 10, 2003

(54) RUBBER/RUBBER LAMINATES

(75) Inventors: Tsuyoshi Noguchi, Settsu (JP); Kazuhisa Matsumoto, Settsu (JP); Tsuyoshi Ono, Settsu (JP); Mitsuru Kishine, Settsu (JP)

(73) Assignee: Daikin Industries, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/367,502

(22) PCT Filed: Jan. 21, 1998

(86) PCT No.: PCT/JP98/00209

§ 371 (c)(1),
(2), (4) Date: Aug. 17, 1999

(87) PCT Pub. No.: WO98/36901

PCT Pub. Date: Aug. 27, 1998

(65) Prior Publication Data

US 2003/0049399 A1 Mar. 13, 2003

(30) Foreign Application Priority Data

Feb. 19, 1997 (JP) .............................. 9-052437

(51) Int. Cl.[7] .................. B32B 25/12; B32B 25/14; B32B 25/16; B32B 25/18; C08L 27/22
(52) U.S. Cl. .................. 428/36.91; 138/137; 138/138; 428/36.8; 428/421; 428/422
(58) Field of Search .................. 138/137, 138; 428/36.8, 36.91, 421, 422

(56) References Cited

U.S. PATENT DOCUMENTS 5,374,484 A  * 12/1994 Kasahara et al. ........... 428/421
5,430,103 A  *  7/1995 Ohata et al. ................ 525/194

OTHER PUBLICATIONS

Patent Abstracts of Japan, Publication No. 05–287156 A, Publication Date Nov. 2, 1993.
Patent Abstracts of Japan, Publication No. 02–024127 A, Publication Date, Jan. 26, 1990.

* cited by examiner

Primary Examiner—Sandra M. Nolan
(74) Attorney, Agent, or Firm—Kubovcik & Kubovcik

(57) ABSTRACT

A rubber laminate in which a rubber layer (1) containing the following rubber composition (A) is adhered by vulcanization to a rubber layer (2) containing another rubber composition (B).

Rubber composition (A): Composition comprising 100 parts by weight of a mixture and 0.1 to 15 parts by weight of a peroxide crosslinking agent admixed therewith, the mixture comprising 5 to 95 wt. % of a peroxide-crosslinkable fluororubber containing vinylidene fluoride copolymerized therein in a proportion of 45 to 88 mole % and having a number average molecular weight of 20,000 to 200,000, and 95 to 5 wt. % of an acrylic rubber containing 0.1 to 1.5 wt. % of a polyfunctional monomer copolymerized therein and having a functional group rendering the acrylic rubber peroxide-cocrosslinkable with the fluororubber and a functional group effecting the copolymerization of the monomer with an acrylic ester.

14 Claims, No Drawings

RUBBER/RUBBER LAMINATES

TECHNICAL FIELD

The present invention relates to a rubber laminate and uses thereof, and more particularly to a rubber laminate having excellent heat resistance and rubber products prepared therefrom such as a hose, etc.

BACKGROUND ART

Fluororubbers are excellent in heat resistance, compression set, oil resistance and resistance to chemicals and are useful in the field of industrial materials and other fields. Nevertheless, it appears unlikely that these rubbers will be used in remarkably increased quantities in spite of their outstanding properties since economy is not negligible for prevalent use in these fields. Additionally, when fluororubbers are used as a material for an oil hose, they have the drawback of deteriorating markedly in the presence of additives contained in engine oils.

Other than fluororubbers, acrylic rubber and copolymer rubber of α,β-unsaturated nitrile-conjugated diene monomer or its hydrogenated copolymer are relatively high in heat resistance and oil resistance, and are widely used as a material for an oil hose.

However, in recent years, an engine room reaches a high temperature increasingly in order to attain an improvement in performance and fuel consumption of automobiles. It is demanded for an oil hose as well to have more improved heat resistance, and conventional acrylic rubber and copolymer rubber of α,β-unsaturated nitrile-conjugated diene monomer or its hydrogenated copolymer become insufficient in heat resistance.

In order to solve the above problem, it is investigated to laminate a fluororubber, and acrylic rubber, copolymer rubber of α,β-unsaturated nitrile-conjugated diene monomer or its hydrogenated copolymer, and then to prepare a hose therefrom by molding (JP-A-169243/1986, JP-A-189934/1986, JP-A-51439/1987, JP-A-152060/1989, JP-A-159245/1989, U.S. Pat. No. 2,526,134). However, since the fluororubber is poor in affinity with other acrylic rubber, etc. and is different in cure formulation, there arises a problem that the laminate has a low adhesiveness between layers and is liable to separate. Further, an amount of the fluororubber is limited in view of cost, and it is difficult to improve sufficiently heat resistant temperature of a hose. Heat resistance herein includes for example excellent compression set which contributes to the hose being hardly separated from a metal pipe, in addition to resistance to oxidative-deterioration by high temperature air, resistance to swelling by high temperature oil, etc.

Although studies were also made on blends of acrylic rubbers and vinylidene fluoride resins (JP-A-39336/1988, JP-A-20341/1988, JP-A-19486/1988, JP-A-8447/1988, JP-A-236841/1987, JP-A-152133/1989 and JP-A-152016/1989), the products still remained to be improved in compression set because vinylidene fluoride resins can not be vulcanized and are crystalline.

An object of the present invention is to provide a rubber laminate which is excellent in heat resistance, compression set and oil resistance, and rubber products prepared therefrom.

DISCLOSURE OF THE INVENTION

The present invention provides a rubber laminate in which a rubber layer (1) containing the following rubber composition (A) is adhered by vulcanization to a rubber layer (2) containing another rubber composition (B).

Rubber composition (A): Composition comprising 100 parts by weight of a mixture and 0.1 to 15 parts by weight of a peroxide crosslinking agent admixed therewith, the mixture comprising 5 to 95 wt. % of a peroxide-crosslinkable fluororubber containing vinylidene fluoride copolymerized therein in a proportion of 45 to 88 mole % and having a number average molecular weight of 20,000 to 200,000, and 95 to 5 wt. % of an acrylic rubber containing 0.1 to 1.5 wt. % of a polyfunctional monomer copolymerized therein and having a functional group rendering the acrylic rubber peroxide-cocrosslinkable with the fluororubber and a functional group effecting the copolymerization of the monomer with an acrylic ester.

According to the rubber composition (A) of the invention, examples of peroxide-crosslinkable fluororubbers are vinylidene fluoride copolymers such as vinylidene fluoride/hexafluoropropylene, vinylidene fluoride/tetrafluoroethylene/hexafluoropropylene and vinylidene fluoride/chlorotrifluoroethylene; copolymers such as tetrafluoroethylene/propylene, hexafluoropropylene/ethylene and fluoro(alkyl vinyl ether)/olefin (for example, vinylidene fluoride/tetrafluoroethylene/perfluoroalkyl vinyl ether), etc. Preferable among these are elastomers of vinylidene fluoride/hexafluoropropylene and vinylidene fluoride/tetrafluoroethylene/hexafluoropropylene. The fluoro(alkyl vinyl ether) may contain a plurality of ether linkages. These fluororubbers are 20,000 to 200,000, preferably 20,000 to 100,000, more preferably 20,000 to 70,000, in molecular weight, i.e., in number average molecular weight. When to be used singly, fluororubbers are generally in excess of 200,000 in molecular weight to exhibit satisfactory characteristics. In contrast, the fluororubber to be compounded with the acrylic rubber for use in the invention fails to give satisfactory processability if exceeding 200,000 in molecular weight, while fully acceptable characteristics are unavailable after vulcanization if the molecular weight is lower than 20,000. The term processability means the viscosity of polymer at high temperatures, vulcanization characteristics and amenability to rolling process. The proportion of copolymerized vinylidene fluoride in the fluororubber is 45 to 88 mole %, preferably 55 to 65 mole % or 80 to 88 mole %, more preferably 55 to 63 mole % or 80 to 85 mole %.

When used singly, fluororubbers tend to lower in glass transition temperature with an increase in the proportion of copolymerized vinylidene fluoride. Fluororubbers also tend to exhibit higher compatibility with acrylic rubbers with an increase in this proportion. However, when compounded with acrylic rubber and if containing 65 to 80 mole % of copolymerized vinylidene fluoride, the fluororubber conversely tends to exhibit a higher glass transition temperature. Further the fluororubber containing 80 to 88 mole % of copolymerized vinylidene fluoride has poor rubber elasticity, is not usable singly as a rubber, but exhibits improved mechanical strength and higher compatibility with acrylic ubbers if compounded with acrylic rubbers. The fluororubber is then highly dispersible in alkyl (meth) acrylate polymers wherein the alkyl has at least 4 carbon atoms and which tend to exhibit lower compatibility with fluororubbers although having a low glass transition temperature. The fluororubber is low in compatibility with acrylic rubbers and encounters difficulty in giving higher dispersibility to polymers if less than 45 mole % in the proportion of copolymerized vinylidene fluoride. Impaired compression set will result if this proportion exceeds 88 mole %.

The fluororubbers of the invention include, for example, iodine-containing fluororubbers, which will be described below.

The preferred examples of iodine-containing fluororubbers include a readily curable fluororubber (see JP-A-125491/1978) which is obtained by polymerizing vinylidene fluoride (VdF) and at least one of monomers comprising a fluorine-containing ethylenically unsaturated compound having 2 to 8 carbon atoms (and when required, a fluorine-free ethylenically unsaturated compound having 2 to 4 carbon atoms) in the presence of a radical generator and an iodine compound represented by the formula $RI_x$ (wherein R is a saturated or unsaturated fluorohydrocarbon group having 1 to 16 carbon atoms, chlorofluorohydrocarbon group or hydrocarbon group having 1 to 3 carbon atoms, and x, which is the number of bonds of R, is an integer of not smaller than 1). Useful iodine-containing fluororubbers are copolymers containing 45 to 88 mole %, preferably 55 to 65 mole %, more preferably 55 to 63 mole %, of vinylidene fluoride (VdF) unit, 0 to 55 mole %, preferably 13 to 25 mole %, of tetrafluoroethylene (TFE) unit and 10 to 40 mole %, preferably 10 to 25 mole %, of hexafluoropropylene (HFP) unit, and copolymers containing 45 to 88 mole %, preferably 80 to 88 mole %, more preferably 80 to 85 mole %, of vinylidene fluoride (VdF) unit, 0 to 55 mole %, preferably 0 to 10 mole %, of tetrafluoroethylene (TFE) unit and 10 to 40 mole %, preferably 10 to 20 mole %, of hexafluoropropylene (HFP) unit.

According to the rubber composition (A) of the invention, the acrylic rubber can be prepared from a combination of (meth)acrylic ester monomer and polyfunctional monomer shown below by copolymerizing the monomers by a known polymerization process.

The (meth)acrylic ester monomer is represented by the formula $CH_2=C(R^1)COOR_2$ wherein $R^1$ is a hydrogen atom or methyl, and $R^2$ is alkyl or alkoxy-substituted alkyl having 1 to 8 carbon atoms. Examples of such monomers are methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, 2-ethylhexyl (meth)acrylate, methoxyethyl (meth)acrylate and ethoxyethyl (meth)acrylate. Preferably $R^2$ has 2 to 4 carbon atoms. When the fluorine-containing polymer contains 55 to 65 mole % of vinylidene fluoride (VdF) unit, it is desired that the (meth)acrylic ester monomer contain at least 40 wt. % of a monomer with 2 carbon atoms. When the fluorine-containing polymer contains 80 to 88 mole % of vinylidene fluoride (VdF) unit, it is desired that the (meth)acrylic ester monomer contain at least 40 wt. % of a monomer with 4 carbon atoms. With an increase in the number of carbon atoms of $R^2$ and an increase in the proportion of the ester monomer to be copolymerized, the acrylic rubber exhibits more excellent low-temperature characteristics but lower oil resistance and lower compatibility with the fluororubber.

Examples of polyfunctional monomers are ethylene glycol di(meth)acrylate, 1,4-butanediol di(meth)acrylate, 1,6-hexanediol di(meth)acrylate, polyethylene glycol di(meth)acrylate, allyl (meth)acrylate, divinylbenzene, triallyl cyanurate and triallyl isocyanurate. Bifunctional monomers are desirable because use of such a monomer having three or more functional groups is likely to present difficulty in controlling the proportion of partially crosslinked component in the resulting copolymer. When the monomer has only one double bond in the molecule, no crosslinking group remains in the acrylic rubber, which therefore is difficult to be cocrosslinked along with the fluororubber. More desirable among the bifunctional monomers are those wherein the two double bonds are different in reactivity in order to permit one of the double bonds to remain in the acrylic rubber as a crosslinking group. More preferable is allyl (meth)acrylate. Although dihydrodicyclopentenyl acrylate and ethylidene norbornene are included in monomers wherein the two double bonds are different in reactivity, these are not usable singly and have to be used conjointly with allyl (meth)acrylate. This is because the bifunctional monomer must be fully crosslinkable with the same auxiliary crosslinking agent as is useful for the fluororubber.

The polyfunctional monomer is used in an amount of 0.1 to 1.5 wt. %, preferably 0.3 to 0.7 wt. %, based on the combined amount of acrylic ester monomer and polyfunctional monomer. If a smaller amount of polyfunctional monomer is used, the acrylic rubber will not be crosslinked sufficiently, presenting difficulty in vulcanization molding and resulting in low heat resistance and poor mechanical properties. An excess of polyfunctional monomer, if used, produces an increased amount of partially crosslinked component in the copolymer, leads to impaired processability and causes vulcanization to result in an excessively high crosslinking density, consequently giving a material which is no longer flexible, impaired in elongation and unusable for materials such as oil hose, etc.

When required to obtain a modified polymer, the (meth)acrylic ester monomer to be polymerized may be partly replaced by an ethylenically unsaturated monomer such as acrylonirile, styrene, vinyl acetate, ethylene or vinyl chloride. The amount of substitute is preferably up to 40 wt. % of the (meth)acrylic ester monomer.

According to the rubber composition (A) of the invention, the ratio of the fluororubber to the acrylic rubber, i.e., flurororubber/acrylic rubber, is 5~95/95~5 by weight. When the proportion of copolymerized vinylidene fluoride in the fluororubber is 55 to 65 mole %, the ratio is preferably 5~90/95~10, more preferably 10~80/90~20. When the proportion of copolymerized vinylidene fluoride in the fluororubber is 80 to 88 mole %, the ratio is preferably 10~90/90~10, more preferably 30~80/70~20. If a lesser amount of fluororubber is used, the resulting material will not have sufficiently improved heat resistance and will be impaired in processability including flowability, whereas an excess of the fluororubber permits the material to deteriorate markedly due to the additive present in engine oil, etc. and is undesirable also economically.

Peroxide crosslinking agents useful for the rubber composition (A) of the invention are generally those which readily produce a peroxy radical when heated or in the presence of an oxidizing or reducing system. Examples of such agents are 1,1-bis(tert-butylperoxy)-3,5,5-trimethylcyclohexane, 2,5-dimethylhexane-2,5-dihydroxy peroxide, di-tert-butyl peroxide, tert-butylcumyl peroxide, dicumyl peroxide, α,α'-bis(tert-butylperoxy)-p-diisopropylbenzene, 2,5-dimethyl-2,5-di(tert-butylperoxy) hexane, 2,5-dimethyl-2,5-di(tert- butylperoxy)hexyne-3, benzoyl peroxide, tert- butylperoxybenzene, 2,5-dimethyl-2,5-di(benzoylperoxy)hexane, tert-butylperoxymaleic acid, tert-butylperoxyisopropyl carbonate, etc. Preferable among these are dialkyl compounds. The kind of agent and the amount thereof to be used are determined in view of the amount of active —O—O— and the decomposition temperature. The amount is usually 0.1 to 15 parts by weight, preferably 0.3 to 5 parts by weight, per 100 parts by weight of the polymers (combined amount of acrylic rubber and fluororubber).

When required, a suitable auxiliary crosslinking agent may be used conjointly. As a rule, useful auxiliary crosslinking agents are not limited particularly in type insofar as they are reactive on peroxy radicals and polymer radicals. Examples of desirable agents are triallyl cyanurate, triallyl isocyanurate, triacrylformal, triallyl trimellitate, dipropargyl terephthalate, diallyl phthalate, tetraallylterephthalamide, triallyl phosphate, bismaleimide, etc. Although the auxiliary crosslinking agent need not always be used, the amount thereof to be used is preferably 0.1 to 10 parts by weight, more preferably 0.3 to 5 parts by weight, per 100 parts by weight of the polymers to be used. Further, it is possible, as required, to add to rubber composition (A) a crosslinking agent, auxiliary crosslinking agent, filler or the like which is usable in the composition to be laminated.

According to the rubber composition (A) of the invention, processing aids, antioxidants, age resistors, antiozonants, ultraviolet absorbers, etc. can be added to the composition when required.

Examples of useful fillers are magnesium oxide, calcium oxide, titanium oxide, silicon oxide, aluminum oxide and like metal oxides, magnesium hydroxide, aluminum hydroxide, calcium hydroxide and like metal hydroxides, magnesium carbonate, aluminum carbonate, calcium carbonate, barium carbonate and like carbonates, magnesium silicate, calcium silicate, sodium silicate, aluminum silicate and like silicates, aluminum sulfate, calcium sulfate, barium sulfate and like sulfates, synthetic hydrotalcite, molybdenum disulfide, iron sulfide, copper sulfide and like metal sulfides, kieselguhr, asbestos, lithopone (zinc sulfide/barium sulfate), graphite, carbon black, carbon fluoride, calcium fluoride, coke, etc.

Examples of processing agents are stearic acid, oleic acid, palmitic acid, lauric acid and like higher fatty acids, sodium stearate, zinc stearate and like higher fatty acid salts, stearic acid amide, oleic acid amide and like higher fatty acid amides, ethyl oleate and like higher fatty acid esters, stearylamine, oleylamine and like higher aliphatic amines, carnauba wax, ceresin wax and like petroleum wax, ethylene glycol, glycerin, diethylene glycol and like polyglycols, vaseline, paraffin and like aliphatic hydrocarbons, silicone oil, silicone polymers, low-molecular-weight polyethylene, phthalic acid esters, phosphoric acid esters, rosin, (halogenated) dialkylamines, (halogenated) dialkylsulfones, surfactants, etc.

Examples of antioxidants, age resistors and antiozonants are 2,5-di-tert-amylhydroquinoline and like phenolic compounds, 2,2,4-trimethyl-1,2-dihydroquinoline and like amine-ketone compounds, 4,4'-bis($\alpha,\alpha'$-dimethylbenzyl) diphenylamine and like aromatic secondary amine compounds.

Examples of ultraviolet absorbers are 2,4-dihydroxybenzophenone and like benzophenone compounds, bis(2,2,6,6-tetramethyl-4-piperidyl)sebacate and like amine compounds, 2-(2'-hydroxy-5'-methylphenyl) benzotriazole and like benzotriazole compounds.

The rubber layer (2) of the invention is not specifically limited so far as it adheres sufficiently to the composition (A) by vulcanization. Examples thereof are butadiene-acrylonitrile rubber, styrene-butadiene rubber, polychloroprene, ethylene-propylene termonomer copolymer, chlorinated polyethylene, chlorosulfonated polyethylene, silicone rubber, butyl rubber, epichlorohydrin rubber, fluororubber, acrylic rubber, ethylene-vinyl acetate copolymer, $\alpha,\beta$-unsaturated nitrile-conjugated diene copolymer, its hydrogenated compound, etc. Among these particularly preferable are fluororubber, acrylic rubber, $\alpha,\beta$-unsaturated nitrile-conjugated diene copolymer and its hydrogenated compound.

Examples of fluororubbers herein are vinylidene fluoride copolymers such as vinylidene fluoride/hexafluoropropylene, vinylidene fluoride/tetrafluoroethylene/hexafluoropropylene and vinylidene fluoride/chlorotrifluoroethylene; copolymers such as tetrafluoroethylene/propylene, tetrafluoroethylene/vinylidene fluoride/propylene, hexafluoropropylene/ethylene and fluoro(alkyl vinyl ether)/olefin (for example, vinylidene fluoride/tetrafluoroethylene/perfluoroalkyl vinyl ether), etc. Preferable among these are elastomers of vinylidene fluoride/hexafluoropropylene and vinylidene fluoride/tetrafluoroethylene/hexafluoropropylene. The fluoro(alkyl vinyl ether) may contain a plurality of ether linkages.

The above acrylic rubber is a copolymer rubber constituted by multiple monomer components of (a) 30 to 99.9% by weight of alkyl acryrate and/or alkoxyalkyl acrylate, (b) 0.1 to 10% by weight of crosslinkable monomer and (c) 0 to 70% by weight of other ethylenically unsaturated compound copolymerizable with the above (a) and (b).

The above $\alpha,\beta$-unsaturated nitrile-conjugated diene copolymer rubber is a copolymer rubber constituted by multiple monomer components of (d) 10 to 60% by weight of $\alpha,\beta$-unsaturated nitrile, (e) 15 to 90% by weight of conjugated diene, and 0 to 75% by weight of other ethylenically unsaturated compound copolymerizable with the above (d) and (e).

Examples of the above alkyl acrylate are compounds represented by the formula

wherein $R^3$ is alkyl having 1 to 18 carbon atoms. Examples of such compounds are methyl acrylate, ethyl acrylate, n-propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate and n-octadecyl acrylate. Among these preferable are methyl acrylate, ethyl acrylate, n-propyl acrylate and n-butyl acrylate, and particularly preferable are methyl acrylate and ethyl acrylate.

Examples of the above alkoxyalkyl acrylate are compounds represented by the formula

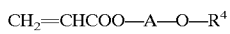

Wherein A is alkylene having 1 to 12 carbon atoms, and $R^4$ is alkyl having 1 to 12 carbon atoms. Examples of such compounds are 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate and 2-(n-butoxy) propyl acrylate. Among these preferable are 2-methoxyethyl acrylate and 2-ethoxyethyl acrylate, and particularly preferable is 2-methoxyethyl acrylate.

Examples of the above crosslinkable monomer are at least one or two of dicyclopentadiene, ethylidenenorbornene, vinyl chloroacetate, allyl chloroacetate, 2-chloroethyl vinyl ether, vinyl acrylate, allyl methacrylate, glycidyl methacrylate, dimethyl steryl vinylsilane, dicyclopentenyl acrylate, dicyclopentenyloxyethyl acrylate, alkyl glycidyl ether, vinyl glycidyl ether, 2-chloroethyl acetate, vinyl monochloroacetate, vinylnorbornene, acrylic acid, methacrylic acid and itaconic acid.

Examples of the above ethylenically unsaturated compound are carboxylic acids such as acrylic acid, methacrylic acid, crotonic acid, 2-pentenic acid, maleic acid, fumaric acid and itaconic acid; methyl methacrylate; octyl methacrylate; alkyl vinyl ketone such as methyl vinyl ketone; vinyl or allyl ether such as vinyl ethyl ether and acryl methyl ether; vinyl aromatic compounds such as styrene, α-methylstyrene, chlorostyrene and vinyltoluene; nitriles such as acrylonitrile and methacrylonitrile; amides such as acrylamide, methacrylamide and N-methylolacrylamide; ethylene; propylene; vinyl chloride; vinylidene chloride; vinyl fluoride; vinylidene fluoride; vinyl acetate; and alkyl fumarate. Among these preferable are acrylonitrile, ethylene and vinyl acetate, and particularly preferable are acrylonitrile and ethylene.

Examples of the above α,β-unsaturated nitrile are acrylonitrile, α-chloroacrylonitrile, β-fluoroacrylonitrile, methacrylonitrile and ethacrylonitrile. Among these preferable is acrylonitrile.

Examples of the above conjugated diene are 1,3-butadiene, 2-chloro-1,3-butadiene and 2-methyl-1,3-butadiene, and 1,3-butadiene is preferable.

The laminate of the present invention can be prepared for example by the following method. Specifically, the composition (A) is prepared by use of a mixer such as a cooling roll, Banbury mixer, intermixer or the like. The composition (B) is obtained similarly. Two layers of the compositions (A) and (B) are extruded simultaneously by an extruder, or alternately extruding an outer layer on an inner layer by use of two extruders, to prepare an inner tube rubber layer composed by the above inner layer and the above outer layer. An outer tube rubber layer is extruded on the inner tube rubber layer by an extruder to unite the rubber layers and then united layers are vulcanized for adhesion to obtain the laminate of the present invention.

The rubber layer (1) made of the composition (A) and the rubber layer (2) made of the composition (B) can be an inner layer or outer layer of the inner tube rubber layer, depending on the use thereof. Thus, they can be used as either inner layer or outer layer.

The rubber laminate of the present invention can stand sufficiently to use under severe conditions and has various uses. For example, the laminate possesses most suitable properties as a hose, tube, lining, diaphragm, packing, roll, etc. which requires sealing property for a long period of time.

BEST MODE OF CARRYING OUT THE INVENTION

The invention will be described below in greater detail with reference to the following examples and comparative examples.

a) Preparation of Crosslinking Site Monomer

Allyl acrylate (hereinafter referred to briefly as "AA") was prepared by the following method.

A 46 g quantity of allyl alcohol and 89 g of triethylamine were placed into a 300-c.c. flask, 80 g of acrylic acid chloride was added dropwise to the contents at 0 to 5° C. over a period of 2 hours, and the mixture was thereafter reacted for 3 hours. The salt produced during the reaction was dissolved in pure water, and the reaction mixture was extracted with ether. The extract was washed with pure water several times and passed through a separating funnel. An ester was separated off, which was fractionated to obtain a purified ester.

"Viscoat #195," brand name of Osaka Yukikagaku Kogyo Co., Ltd., was used as it was as 1,4-butanediol diacrylate (hereafter abbreviated as "14BGA"), and "Acrylic ester A," brand name of Mitsubishi Rayon Co., Ltd., as allyl methacrylate (hereinafter abbreviated as "AMA").

b) Polymerization of Acrylic Rubber

Into a separable flask equipped with a thermometer, stirrer, nitrogen supply tube and evacuating device were placed 480 parts of water, 0.24 part of sodium bicarbonate, 0.48 part of sodium laurylsulfate, 0.48 parts of Nonipole 200 (polyoxyethylene nonylphenyl ether) and 100 parts of monomer mixture of Table 1, the oxygen within the system was thoroughly removed by repeating evacuation and nitrogen replacement, and 0.01 part of sodium hydrosulfite, 0.002 part of sodium formaldehyde sulfoxylate and 0.005 part of tert-butyl hydroperoxide were thereafter placed in to start a polymerization reaction at 50° C. The reaction was continued for 6 hours so as to achieve a polymerization conversion within the range of 95 to 99%, followed by salting-out of the reaction mixture, sufficient washing with water and drying to obtain an acrylic rubber. Incidentally, EA stands for ethyl acrylate, and BA for butyl acrylate.

TABLE 1

| Acrylic rubber amount (wt. %) | A-1 | A-2 |
|---|---|---|
| EA | 99.9 | 49.75 |
| BA |  | 49.75 |
| AA | 0.1 | 0.5 | c) Polymerization of Fluororubber

Into a polymerization reactor made of SUS and having a capacity of 3 liters were placed 1 liter of pure water and 2 g of C7F15COONH4 serving as an emulsifier, the interior of the system was fully replaced by nitrogen gas, and an initial monomer mixture of VdF/HFP/TFE was forced into the reactor at 80° C. to an internal pressure of 16 kg/cm$^2$ G. Subsequently, 10 ml of a 0.2 wt. % aqueous solution of ammonium persulfate was forced in to start a reaction.

Since the pressure dropped with the progress of the polymerization reaction, $I(CF_2)_4I$ serving as a molecular weight adjusting agent was forced in upon a pressure drop to 15 kg/cm$^2$ G. When the pressure further dropped to 14 kg/cm$^2$ G, the system was repressurized with a continuous monomer mixture of VdF/HFP/TFE to the pressure of 16 kg/cm$^2$ G. The aqueous solution of ammonium persulfate was forced into the system with nitrogen gas every 3 hours in an amount of 10 ml each time to continue the reaction with repeated decrease and increase in the pressure to obtain an aqueous emulsion.

To the emulsion was added a 5 wt. % aqueous solution of potash alum for coagulation, and the coagulated product was washed with water and dried to obtain a rubberlike polymer. The initial monomer mixture, the amount of $I(CF_2)_4I$, subsequent monomer mixture, reaction time and yield are listed in Table 2, in which 2F stands for VdF (vinylidene fluoride), 4F for TFE (tetrafluoroethylene) and 6F for HFP (hexafluoropropylene).

TABLE 2

| Fluororubber (mole %) | F-1 | F-2 |
|---|---|---|
| Vinylidene fluoride | 85 | 61 |
| Tetrafluoroethylene | 0 | 18 |
| Hexafluoropropylene | 15 | 21 |

The number average molecular weight of the copolymer was determined by the following method.

[Conditions for Determining Molecular Weight]

Gel permeation chromatograph: High performance GPC device, HLC-8020 (product of Toso Co., Ltd.)

Columns: TSK guard column $H_{hr}$-H (one), TSK gel-G5000H, -G4000H, -G3000H, -G2000H (one each) (products of Toso Co., Ltd.)

Sensor: RI sensor (differential reflectometer) incorporated in HLC-8020

Data analysis: Supersystem Controller SC-8020 (product of Toso Co., Ltd.)

Developer solvent: Tetrahydrofuran

Temperature: 35° C.

Concentration: 0.5 wt. %

Standard polymers for molecular weight calibration curve: Monodisperse polystyrenes, TSK standard POLYSTYREN [Mw/Mn=1.14 (max)] (product of Toso Co., Ltd.)

The composition of the copolymer was determined by 19F NMR measurement.

Mooney viscosity was measured according to JIS K-6300.

[Preparation of Composition for Crosslinking]

Compositions (A) were prepared each by kneading a fluororubber, acrylic rubber and other components in the amounts specified in Table 3 by an open roll mill. Compositions (B) were prepared each by kneading a fluororubber, acrylic rubber, unsaturated nitrile-conjugated diene copolymer rubber and other components in the amounts specified in Table 4 by an open roll mill. Seast 116 is carbon black of the MAF type manufactured by Tokai Carbon Co., Ltd., TAIC is triallyl isocyanurate manufactured by Nihon Kasei Co., Ltd., Perhexa 25B is a peroxide manufactured by Nippon Oils & Fats Co., Ltd., and Naugard 445 is an age resistor manufactured by Uniroyal Chemical Co., Ltd. Sumifine BM is N,N'-m-phenylenebismaleimide manufactured by Sumitomo Chemical Co., Ltd., and Perbutyl P is a peroxide manufactured by Nippon Oils & Fats Co., Ltd.

EXAMPLES 1 TO 15

Comparative Examples 1 to 6

Adhesion by vulcanization: A laminate in the form of sheet was prepared by laminating a sheet made of the composition (A) and a sheet made of the composition (B), placing the laminate in a heated die and vulcanizing the laminate with heat and pressure of 170° C. for 15 minutes.

A laminate in the form of sheet was prepared in the same manner as above except that two kinds of sheets made of the composition (B) were laminated for comparison.

Adhesive strength: The above laminate was cut into a strip 15 mm in width and its adhesive strength was measured by 180° peeling test according to peeling test method defined in JIS K 6801, item 7. The other properties were measured according to JIS K 6301. Tables 3 to 10 show the results.

Extruding evaluation: TOYO SEIKI Co., Ltd., CAPIROGRAPH

Extruding temperature: 100° C.

Shear rate: 11.6 ($sec^{-1}$)

TABLE 3

| Composition (A) | 3-1 | 3-2 | 3-3 | 3-4 | 3-5 | 3-6 | 3-7 | 3-8 |
|---|---|---|---|---|---|---|---|---|
| A-1 | 50 | 50 | 70 |  |  |  | 20 |  |
| A-2 |  |  |  | 50 | 50 | 70 |  | 20 |
| F-1 | 50 |  | 30 |  | 50 |  | 80 |  |
| F-2 |  | 50 |  | 50 |  | 30 |  | 80 |

TABLE 3-continued

| Composition (A) | 3-1 | 3-2 | 3-3 | 3-4 | 3-5 | 3-6 | 3-7 | 3-8 |
|---|---|---|---|---|---|---|---|---|
| Seast 116 | 30 | 30 | 40 | 30 | 30 | 40 | 20 | 20 |
| Perhexa 25B | 1.5 | 1.5 | 1.5 | 1.5 | 1.5 | 1.5 | 1.5 | 1.5 |
| Naugard 445 | 1 | 1 | 1 | 1 | 1 | 1 | 1 | 1 |
| Stearic acid | 1 | 1 | 1 | 1 | 1 | 1 | 1 | 1 |

TABLE 4

| Composition (B) | 4-1 | 4-2 | 4-3 | 4-4 | 4-5 | 4-6 |
|---|---|---|---|---|---|---|
| DAI-EL G902 | 100 |  |  |  |  |  |
| DAI-EL G702 |  | 100 |  |  |  |  |
| AFLAS#150 |  |  | 100 |  |  |  |
| AR71 |  |  |  | 100 |  |  |
| VAMAC |  |  |  |  | 100 |  |
| Zetpol |  |  |  |  |  | 100 |
| MT Carbon | 20 | 20 | 25 |  |  |  |
| Seast 116 |  |  |  | 60 | 50 | 40 |
| Ca(OH)$_2$ |  | 6 |  |  |  |  |
| MgO |  | 3 |  |  |  |  |
| TAIC | 4 |  | 5 |  |  | 1 |
| Perhexa 25B | 1.5 |  |  |  |  | 2.8 |
| Zinc oxide |  |  |  |  |  | 5.0 |
| Sulfur |  |  |  | 0.3 |  |  |
| Stearic acid Na |  |  | 2.0 | 0.5 |  |  |
| Stearic acid K |  |  |  | 0.3 |  |  |
| Naugard 445 |  |  |  | 2.0 | 2 | 1.5 |
| NOCRAC MB |  |  |  |  |  | 1.5 |
| Stearic acid |  |  |  | 1.0 | 2 | 0.5 |
| Perbutyl P |  |  |  | 1.0 | 2.5 |  |
| Sumifine BM |  |  |  |  | 1 |  |

DAI-EL G902: iodine-containing terpolymer of vinylidene fluoride (2F)-tetrafluoroethylene (4F)-hexafluoropropylene (6F), Daikin Industries, Ltd.

DAI-EL G702: copolymer of 2F-6F, Daikin Industries, Ltd.

AFLAS#150: terpolymer of 4F-propylene-2F, Asahi Glass Company Ltd.

AR-71: acrylic rubber, Nippon Zeon Co., Ltd.

VAMAC: VAMAC D, ethylene-acrylate copolymer, E.I. Du Pont de Nemours and Company Zetpol: Zetpol 2000, hydrogenated nitrile-butadiene rubber NOCRAC MB: antioxidant, Ouchi Shinko Chemical Industrial Co., Ltd.

Sumifine BM: bismaleimide

TABLE 5

| Composition (A) | 3-4 | 3-2 | 3-3 | 3-4 | 3-5 | 3-6 | 3-7 | 3-8 |
|---|---|---|---|---|---|---|---|---|
| Break strength | 145 | 125 | 115 | 101 | 108 | 95 | 161 | 109 |
| Break elongation | 410 | 370 | 350 | 300 | 320 | 280 | 480 | 340 |

TABLE 6

| Composition (B) | 4-1 | 4-2 | 4-3 | 4-4 | 4-5 | 4-6 |
|---|---|---|---|---|---|---|
| Break strength | 220 | 170 | 160 | 115 | 120 | 270 |
| Break elongation | 380 | 240 | 270 | 280 | 350 | 380 |

TABLE 7

| Example | 1 | 2 | 3 | 4 | 5 | 6 | 7 | 8 | 9 | 10 |
|---|---|---|---|---|---|---|---|---|---|---|
| Layer 1 | 3-1 | 3-2 | 3-3 | 3-4 | 3-6 | 3-2 | 3-3 | 3-4 | 3-5 | 3-6 |
| Layer 2 | 4-1 | 4-2 | 4-3 | 4-4 | 4-5 | 4-1 | 4-1 | 4-1 | 4-1 | 4-1 |
| Adhesive strength | 1.7 | 1.6 | 1.5 | 1.2 | 1.3 | 1.5 | 1.4 | 1.2 | 1.3 | 1.2 |

TABLE 8

| Example | 11 | 12 | 13 | 14 | 15 | 16 | 17 | 18 | 19 | 20 |
|---|---|---|---|---|---|---|---|---|---|---|
| Layer 1 | 3-2 | 3-3 | 3-4 | 3-5 | 3-6 | 3-7 | 3-7 | 3-7 | 3-7 | 3-7 |
| Layer 2 | 4-3 | 4-3 | 4-3 | 4-3 | 4-3 | 4-1 | 4-2 | 4-3 | 4-4 | 4-5 |
| Adhesive strength | 1.4 | 1.4 | 1.1 | 1.3 | 1.2 | 1.7 | 1.6 | 1.6 | 1.2 | 1.1 |

TABLE 9

| Example | 21 | 22 | 23 | 24 | 25 | 26 | 27 | 28 | 29 | 30 | 31 |
|---|---|---|---|---|---|---|---|---|---|---|---|
| Layer 1 | 3-7 | 3-8 | 3-8 | 3-8 | 3-8 | 3-1 | 3-2 | 3-3 | 3-4 | 3-5 | 3-6 |
| Layer 2 | 4-6 | 4-3 | 4-4 | 4-5 | 4-6 | 4-6 | 4-6 | 4-6 | 4-6 | 4-6 | 4-6 |
| Adhesive strength | 1.1 | 1.5 | 1.2 | 1.0 | 1.1 | 1.3 | 1.3 | 1.4 | 1.2 | 1.3 | 1.4 |

TABLE 10

| Com. Example | 1 | 2 | 3 | 4 | 5 | 6 |
|---|---|---|---|---|---|---|
| Layer 1 | 4-1 | 4-1 | 4-1 | 4-3 | 4-3 | 4-3 |
| Layer 2 | 4-4 | 4-5 | 4-6 | 4-4 | 4-5 | 4-6 |
| Adhesive strength | 0.7 | 0.6 | 0.5 | 0.6 | 0.7 | 0.5 |

INDUSTRIAL APPLICABILITY

The use of the rubber composition of the invention provides rubber laminate and rubber products prepared therefrom which are low in compression set and excellent in mechanical strength and other physical properties, and heat resistance.

What is claimed is:

1. A rubber laminate in which a rubber layer (1) made of rubber composition (A) is adhered by vulcanization to a rubber layer (2) containing another rubber composition (B):
    wherein (A) is a composition comprising 100 parts by weight of mixture and 0.1 to 15 parts by weight of a peroxide crosslinking agent admixed therewith, the mixture comprising 5 to 95 wt. % of a peroxide-crosslinkable fluororubber containing vinylidene fluoride copolymerized therein in a proportion of 45 to 88 mole % and having a number average molecular weight of 20,000 to 200,000, and 95 to 5 wt. % of an acrylic rubber containing 0.1 to 1.5 wt % of a bifunctional monomer copolymerized therein and having a functional group rendering the acrylic rubber peroxide-cocrosslinkable with the fluororubber and a functional group effecting the copolymerization of the monomer with an acrylic ester; and
    (B) is a composition comprising at least one of butadiene-acrylonitrile rubber, styrene-butadiene rubber, polychloroprene, ethylene-propylene termonomer copolymer, chlorinated polyethylene, chlorosulfonated polyethylene, silicone rubber, butyl rubber, epichlorohydrin rubber, fluororubber, acrylic rubber, ethylene-vinyl acetate copolymer, and α,β-unsaturated nitrile-conjugated diene copolymer or its hydrogenated compound.

2. A rubber laminate as defined in claim 1 wherein, in the rubber composition (A), 5 to 55% by weight of the fluororubber and 95 to 45% by weight of the acrylic rubber are used.

3. A rubber laminate as defined in claim 1 wherein the proportion of copolymerized vinylidene fluoride in the fluororubber is 55 to 65 mole %.

4. A rubber laminate as defined in claim 1 wherein the proportion of copolymerized vinylidene fluoride in the fluororubber is 80 to 88 mole %.

5. A rubber laminate as defined in claim 1 wherein the fluororubber is an iodine-containing fluororubber.

6. A rubber product prepared from the rubber laminate of claim 1.

7. A rubber product as defined in claim 6 wherein the rubber product is a hose, tube, lining, diaphragm, packing or roll.

8. A rubber laminate as defined in claim 2 wherein the proportion of copolymerized vinylidene fluoride in the fluororubber is 55 to 65 mole %.

9. A rubber laminate as defined in claim 2 wherein the proportion of copolymerized vinylidene fluoride in the fluororubber is 80 to 88 mole %.

10. A rubber laminate as defined in claim 2 wherein the fluororubber is an iodine-containing fluororubber.

11. A rubber laminate as defined in claim 3 wherein the fluororubber is an iodine-containing fluororubber.

12. A rubber laminate as defined in claim 8 wherein the fluororubber is an iodine-containing fluororubber.

13. A rubber laminate as defined in claim 4 wherein the fluororubber is an iodine-containing fluororubber.

14. A rubber laminate as defined in claim 9 wherein the fluororubber is an iodine-containing fluororubber.

* * * * *